(No Model.)

M. C. AYER.
CUTTER BAR FOR MOWERS.

No. 486,816. Patented Nov. 22, 1892.

Witnesses:
C. H. Mosley
James L. Todd

Inventor:
Melville C. Ayer
by S. W. Bates
his Atty.

United States Patent Office.

MELVILLE C. AYER, OF BIDDEFORD, ASSIGNOR OF ONE-HALF TO WILLIAM H. STEVENS, OF PORTLAND, MAINE.

CUTTER-BAR FOR MOWERS.

SPECIFICATION forming part of Letters Patent No. 486,816, dated November 22, 1892.

Application filed May 26, 1892. Serial No. 434,382. (No model.)

*To all whom it may concern:*

Be it known that I, MELVILLE C. AYER, a citizen of the United States, residing at Biddeford, in the county of York and State of Maine, have invented certain new and useful Improvements in Cutter-Bars for Mowers, &c.; and I do hereby declare the following to be a full, clear, and exact description of the invention, such as will enable others skilled in the art to which it appertains to make and use the same.

My invention relates to a cutter-bar for mowers and reapers wherein the knives are pivoted to the cutter-bar and oscillated for the purpose of producing a shearing cut on the grass.

The object of my invention is to construct a cutter-bar of this class which shall have no openings into which the dirt can work to reach the working parts and which shall be smooth and unobstructed on top in order that the grass after being cut shall slide over it without clogging. I desire, also, to so secure the knives that their front ends cannot be bent up from the cutter-bar to allow dirt to work under them and to make the knife easily removable in case of breakage. These results and others I attain by means of the cutter-bar which is the subject of my present invention, the particular features of which will be hereinafter pointed out and claimed.

I have illustrated my invention in the accompanying drawings, in which—

Figure 1:
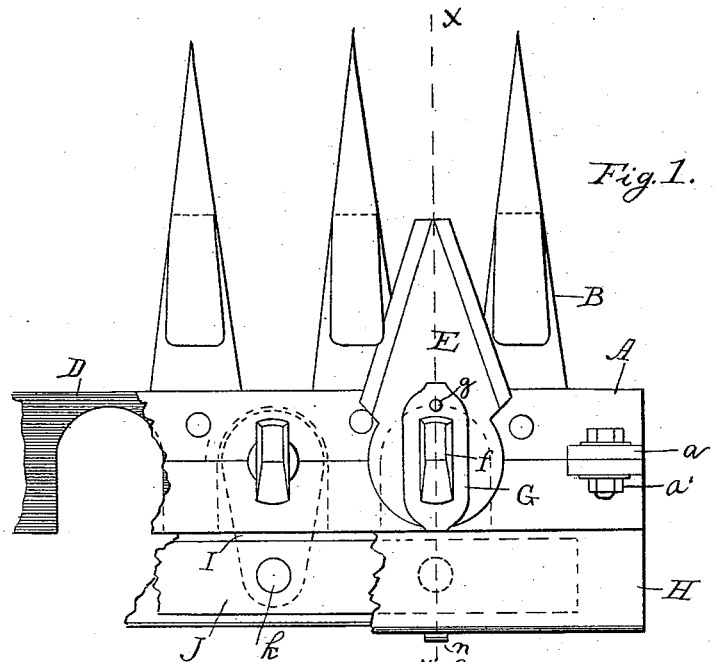
Figure 2:
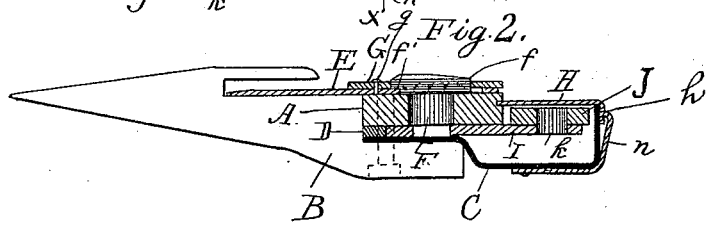
Figure 3:
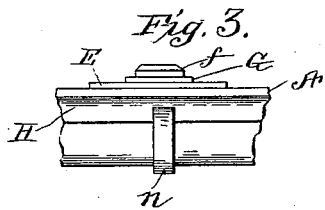
Figure 4:
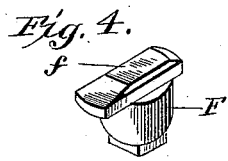

Figure 1 is a plan or top view of a portion of a cutter-bar. Fig. 2 is a section on line $x$ $x$ of Fig. 1. Fig. 3 is a rear view. Fig. 4 is a detail of the stud.

A represents the finger-bar, which I prefer to make in two parts joined together by means of bolts $a'$ passing through ears $a$ or in any other suitable manner.

B are the fingers, which are bolted to the under side of the finger-bar in the usual manner.

E represents one of the knives, which rests on top of the finger-bar and is secured to the top of a stud F, which is journaled vertically between the two sections of the finger-bar. The knife E is secured to the top of the stud, so that it may be readily removed, and will still be so firmly held that it will resist the shocks to which it is subject without becoming loosened. To accomplish this, I form on the upper end of the stud F a head $f$, which I prefer to make elongated, in order to give the greatest possible bearing laterally, the elongation extending crosswise of the bar. Over this head the knife fits, the head passing through an opening, preferably of its exact size, formed in the knife. In the forward end of the head next the surface of the cutter-bar is formed a recess $f'$, into which fits that portion of the knife immediately in front of the opening. The knife is put on over the head and slipped back into the recess $f'$. The knife is kept in position on the head by means of a spring-plate G, which is secured to the knife forward of the head by means of a rivet $g$. The rear end of this spring-plate is free, and it is provided with an opening through which the head passes. The rear edge of this opening rests against the rear end of the head when the knife is in position, thus retaining the knife in the slot or recess $f'$. In putting the knife on the head it is forced down over the head, slid into the recess $f'$, and the spring-plate snapped into place. The rear end of the spring-plate remains on top of the back end of the head until the knife slides back into the recess, when the plate snaps down, holding the knife firmly in place. When the knife is to be removed, the rear end of the spring-plate is lifted until it is above the top of the head and the knife moved forward, releasing it from the slot. The lower end of the stud F is made square, as herein shown, and to it is secured an arm or lever I, which extends backward and is pivoted in rear of the finger-bar to a pitman-bar by means of a pivot $k$. I prefer to use a pitman-bar to reciprocate the knife, as I have stated; but it may be done by any other suitable mechanism.

A casing C is secured on the under side of the finger-bar and a suitable space for the arms I is provided by inserting a welt-plate D between the casing C and the finger-bar, this welt-bar having spaces cut out from it to allow the levers I to move. The casing C extends rearward beyond the pitman-bar J, and there turns up on the back side. The pitman-bar and the arms I are covered and protected by means of a cover H, which fits a groove along the back edge of the finger-bar and turns down over the upturned edge of the casing C, where it is fastened by means of a spring-strop n, secured to the casing and snapping into a hole h in the cover. It will thus be seen that the knife E is solidly secured on top of the finger-bar in a manner to resist particularly any tendency to lift its forward end, and so allow dirt to work under it. It can be quickly put on and taken off. It has a wide bearing where the strain ordinarily comes, and it may be cheaply made, so that a broken one can be replaced with small expense. The whole finger-bar is flat and clear from anything that would obstruct the grass after it fell. Bringing the arm by which the knife is operated below the bar instead of above, as it has heretofore been constructed, enables the top surface of the cutter-bar to be kept clear.

All the parts are tightly closed, so that there is no chance for grass and dirt to work in and clog the parts.

I claim—

1. A cutting apparatus for mowers and harvester, sconsisting of a finger-bar, studs each journaled vertically in said finger-bar, a knife secured to the top of said stud, an arm or lever secured to the lower end of said stud below said finger-bar, and means for imparting an oscillating motion to said arm or lever, in combination, substantially as described.

2. In a cutting apparatus for mowers and reapers, the combination, with a finger-bar, of studs each journaled vertically in said finger-bar, said stud having a head projecting above the upper surface of said finger-bar, said head having a recess formed in its forward end next the surface of said cutter-bar, a knife resting on said finger-bar and having an opening for said head to pass through that portion of the knife immediately in front of said opening, fitting said recess when in position, a spring-plate secured to said knife in front of said head and having an opening through which said head passes, the rear end of said opening being in contact with the rear end of said head when the knife is in position, substantially as described.

3. In a cutting apparatus for mowers and reapers, the combination, with a finger-bar, of studs each journaled vertically in said finger-bar, said stud having a head extending above the upper surface of said finger-bar, said head having a recess formed in its forward end next the surface of said cutter-bar, a knife fitting over said head and within said recess, and a spring-plate for retaining said knife within said recess, substantially as described.

4. In a cutting apparatus for mowers and reapers, the combination, with a finger-bar, of studs journaled vertically in said finger-bar, knives secured to the upper ends of said studs, an arm or lever secured to the lower end of each of said studs below said finger-bar, a casing secured to the under side of said finger-bar and extending rearward and turned up beyond the end of said arm or lever, and a cover for said casing, fitting in a groove in the rear of said bar and having a flange fitting down over the upturned edge of said casing, and means for retaining said cover in position, substantially as described.

5. A cutter-bar for mowers and harvesters, consisting of a finger-bar, studs each journaled vertically in said finger-bar, a knife secured to the top of said stud, an arm or lever secured to the lower end of said stud below said finger-bar, and means for imparting an oscillating motion to said arm or lever, in combination with a cover for the reciprocating mechanism, making a tight connection with said finger-bar in rear of said knives, substantially as described.

In testimony whereof I affix my signature in presence of two witnesses.

MELVILLE C. AYER.

Witnesses:
S. W. BATES,
JAMES F. TODD.